United States Patent
Shao et al.

(10) Patent No.: US 9,563,881 B2
(45) Date of Patent: Feb. 7, 2017

(54) FAIR PAYMENT PROTOCOL WITH SEMI-TRUSTED THIRD PARTY

(75) Inventors: Jun Shao, State College, PA (US); Min Feng, Beijing (CN); Bin B. Zhu, Edina, MN (US)

(73) Assignee: Microsoft Technology Licensing, LLC, Redmond, WA (US)

(*) Notice: Subject to any disclaimer, the term of this patent is extended or adjusted under 35 U.S.C. 154(b) by 2296 days.

(21) Appl. No.: 12/147,860

(22) Filed: Jun. 27, 2008

(65) Prior Publication Data

US 2009/0327142 A1    Dec. 31, 2009

(51) Int. Cl.
| | |
|---|---|
| G06Q 20/00 | (2012.01) |
| G06Q 20/02 | (2012.01) |
| G06Q 20/12 | (2012.01) |
| G06Q 20/38 | (2012.01) |
| G06Q 20/40 | (2012.01) |
| G06Q 30/06 | (2012.01) |

(52) U.S. Cl.
CPC ............. *G06Q 20/02* (2013.01); *G06Q 20/12* (2013.01); *G06Q 20/1235* (2013.01); *G06Q 20/389* (2013.01); *G06Q 20/401* (2013.01); *G06Q 30/06* (2013.01)

(58) Field of Classification Search
USPC ..................................... 705/64, 75; 713/176
See application file for complete search history.

(56) References Cited

U.S. PATENT DOCUMENTS

| | | | |
|---|---|---|---|
| 6,327,574 B1 | 12/2001 | Kramer et al. | |
| 6,587,547 B1 * | 7/2003 | Zirngibl et al. | ........... 379/88.17 |
| 6,983,371 B1 * | 1/2006 | Hurtado et al. | ............... 713/189 |
| 7,028,187 B1 | 4/2006 | Rosen | |
| 7,472,074 B1 * | 12/2008 | Walker et al. | ............. 705/26.82 |

(Continued)

FOREIGN PATENT DOCUMENTS

| | | |
|---|---|---|
| EP | EP0969430 A1 | 1/2000 |
| WO | WO0064088 A1 | 10/2000 |

OTHER PUBLICATIONS

Ateniese, "Efficient Verifiable Encryption (and Fair Exchange) of Digital Signatures", Proceedings of the 6th ACM Conference on Computer and Communications Security, ACM, 1999, pp. 138-146.

(Continued)

*Primary Examiner* — Tsan-Yu J Huang
(74) *Attorney, Agent, or Firm* — Sandy Swain; Micky Minhas

(57) ABSTRACT

Described is an optimistic fair payment protocol in electronic commerce that provides fair payment while resisting an unconscious double spending attack and other attacks. A buyer receives encrypted e-goods from a merchant, and sends payment to the merchant. If decryption information is not received in exchange for the payment, or the decryption information does not render the e-goods useable, the buyer launches a dispute with a third party dispute resolution service. If the decryption information is received and renders the e-goods useable, the buyer determines whether the e-goods are valid, according to a corresponding description. If not valid, the buyer launches a dispute and provides the e-goods and the description. The third party uses the description to evaluate the validity of the goods to determine whether to refund the payment to the buyer or release it to the merchant.

20 Claims, 5 Drawing Sheets

(56) References Cited

U.S. PATENT DOCUMENTS

| | | | |
|---|---|---|---|
| 7,707,107 B2* | 4/2010 | Gebb et al. ............... | 705/39 |
| 2002/0091640 A1 | 7/2002 | Gupta | |
| 2004/0031856 A1 | 2/2004 | Atsmon et al. | |
| 2004/0073790 A1 | 4/2004 | Ateniese et al. | |
| 2004/0093494 A1* | 5/2004 | Nishimoto et al. ........ | 713/165 |
| 2005/0177510 A1 | 8/2005 | Hilt et al. | |
| 2006/0259397 A1 | 11/2006 | Schluetter | |

OTHER PUBLICATIONS

Garay, et al., "Abuse-free Optimistic Contract Signing", Proceedings of the 19th Annual International Cryptology Conference on Advances in Cryptology, 1999, pp. 18.

Qingtao, et al., "A Fair-Exchange Protocol Based on Off-line Semi-Trusted Third Party", IJCSNS International Journal of Computer Science and Network Security, vol. 7 No. 7, Jul. 2007, pp. 208-212.

Zhou, et al., "An Efficient Non-repudiation Protocol", Proceedings of the 10th IEEE workshop on Computer Security Foundations, 1997, pp. 7.

Asokan, et al., "Optimistic Protocols for Fair Exchange", Proceedings of the 4th ACM conference on Computer and communications security, 1997, pp. 1-24.

Asokan, et al., "Optimistic Fair Exchange of Digital Signatures", Oct. 18, 1999, pp. 1-34.

Asokan, et al., "Asynchronous Protocols for Optimistic Fair Exchange", Published in the Proceedings of S&P'98, IEEE, 1998, pp. 15.

Asokan, et al.,"Optimistic Fair Exchange of Digital Signatures", IEEE Journal on Selected Areas in Communications, vol. 18, No. 4, Apr. 2000, IEEE, 2000, pp. 593-610.

Ateniese, "Verifiable Encryption of Digital Signatures and Applications", ACM Transactions on Information and System Security, vol. 7, No. 1, Feb. 2004, ACM, 2004, pp. 1-20.

Ben-Or, et al., "A Fair Protocol for Signing Contracts", IEEE Transactions on Information Theory, vol. 36, No. 1, Jan. 1990, pp. 40-46.

Brands, "Untraceable Off-line Cash in Wallets with Observers", Springer-Verlag, 1998, pp. 302-318.

Chaum, "Blind Signature for Untraceable Payments", Springer-Verlag, 1998, pp. 199-204.

Chaum, "Designated Confirmer Signatures", Springer-Verlag, 1998, pp. 86-91.

Canetti, et al., "Relaxing Chosen-Ciphertext Security", Aug. 19, 2003, pp. 39.

Camenisch, et al., "Endorsed E-Cash", IEEE Symposium on Security and Privacy (SP'07), IEEE Computer Society, IEEE, pp. 15.

Cox, et al., "NetBill Security and Transaction Protocol", Proceedings of the 1st conference on USENIX Workshop on Electronic Commerce—vol. 1, 1995, pp. 12.

Cramer, et al., "A Practical Public Key Cryptosystem Provably Secure Against Adaptive Chosen Ciphertext Attack", Proceedings of the 18th Annual International Cryptology Conference on Advances in Cryptology, May 1998, pp. 1-18.

Franklin, et al., "Fair Exchange with a Semi Trusted Third Party", Proceedings of the 4th ACM Conference on Computer and Communications Security, Apr. 1997, pp. 1-6.

Goldwasser, et al., "A Digital Signature Scheme Secure Against Adaptive Chosen-Message Attacks", SIAM Journal on Computing, vol. 17, No. 2, Mar. 23, 1995, pp. 1-26.

Nenadic, et al., "RSA-based Certified Delivery of E-Goods Using Verifiable and Recoverable Signature Encryption", Proc. IEEE International Conference on Information Technology ITCC, 2004, pp. 18.

"Non-Interactive Zero-Knowledge Proof of Knowledge and Chosen Ciphertext Attack", Proceedings of the 11th Annual International Cryptology Conference on Advances in Cryptology, Springer-Verlag, 1998, pp. 12.

Schnorr, "Efficient Signature Generation by Smart Cards", Mar. 1991, vol. 4, No. 3, pp. 1-22.

Wang, "Untraceable Fair Network Payment Protocols with Off-line TTP", 2003, pp. 15.

Vogt, "Asynchronous Optimistic Fair Exchange Based on Revocable Items", Springer Berlin / Heidelberg, vol. 2742, 2003, pp. 15.

Zhou, et al., "A Fair Non-Repudiation Protocol", Proceedings of the 1996 IEEE Symposium on Security and Privacy, 1996, pp. 7.

Bao, Feng, "Colluding Attacks to a Payment Protocol and Two Signature Exchange Scheme", ASIACRYPT 2004, 13 pages.

Boyd, Colin and Foo, Ernest, "Off-line Fair Payment Protocols using Convertible Signature", 1998, 15 pages.

Daemen, Joan and Rijmen, Vincent, "The Design of Rijndael: AES—The Advanced Encryption Standard", Springer, 1998, 128 pages.

Payeras-Capella, Magdalena M., et al., "Solving Bao's Colluding Attack in Wang's Fair Payment Protocol", OTM Workshops 2006, 9 pages.

Kim, Sangjin and Oh, Heekuck, "Fair Offline Payment Using Verifiable Encryption", Springer-Verlag Berlin Heidelberg 2004, 16 pages.

* cited by examiner

FAIR PAYMENT PROTOCOL WITH SEMI-TRUSTED THIRD PARTY

BACKGROUND

In commercial transactions, fairness needs to be guaranteed in any acceptable model. This is difficult in an electronic world because receiving the goods from a merchant and getting the payment in exchange cannot occur simultaneously in a distributed system; any protocol used in a network is asynchronous by nature.

This leads to a number of attacks, which have been well researched, and generally conclude that a trusted third party is required to achieve fairness. Simple fair exchange protocols need an active trusted third party (trusted third party) which gets involved in every message exchange. More sophisticated types of protocols are referred to as optimistic protocols, in which a trusted third party is not involved unless there is a dispute, which occurs infrequently. In the above optimistic protocols, a buyer exchanges his signature instead of virtual money. After the exchange, the merchant can use the signature to get money from a bank. As a result of the trusted third party only being occasionally involved, that is, when there is a dispute, optimistic protocols are more efficient. However, note that such optimistic protocols do not protect the buyer's privacy.

In order to solve this problem, there is described the use of e-coins for payment instead of a buyer's signature, where e-coins comprise an untraceable fair payment protocol with an off-line trusted third party. The protocol uses an untraceable offline e-coin and a new primitive referred to as a restrictive confirmation signature scheme (RCSS), in which a signature is confirmed by a designated confirmer, and can be verified only by some specified verifiers.

However, a dishonest merchant may collude with a conspirator to obtain the digital money without delivering the goods to a buyer, essentially taking advantage of the lack of a link between the RCSS-signed order agreement and the buyer's e-coins. To this end, the merchant can send his conspirator's RCSS-signed order agreement and the buyer's pseudo-e-coins in the dispute stage, whereby the trusted third party sends the e-goods to the conspirator, and the real e-coins to the merchant, but nothing to the buyer.

Although there is a proposed solution to the above collusion attack, that improved solution as well as the original solution suffer from a new type of attack, referred to herein as an unconscious double-spending (UDS) attack. More particularly, by exploiting the fact that e-coins can be duplicated unlimited times but are allowed to be spent only once, an unconscious double-spending attack can make an innocent buyer unconsciously spend the same money twice.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which an optimistic fair payment protocol provides fair payment while resisting an unconscious double spending attack and other attacks. In one aspect, a buyer receives encrypted e-goods from a merchant as part of a transaction, and sends payment to the merchant. If decryption information is not received from the merchant in exchange for the payment, the buyer launches a dispute with a third party dispute resolution service in response, which can provide other decryption information or a refund.

If the decryption information is received, the buyer uses the decryption information to determine whether the encrypted e-goods received from the merchant are useable with that decryption information. If not useable, the buyer launches a dispute with the third party dispute resolution service which can provide other decryption information or a refund.

If the decryption information is received and is useable, the buyer determines whether the e-goods received from the merchant are valid, according to a description of those e-goods. If not valid, the buyer launches a dispute with the third party dispute resolution service including providing the goods (a copy) with a description of those goods. The third party uses the description to evaluate the validity of the goods; if valid, payment is released to the merchant, while if not valid, a refund is returned to the buyer.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards an optimistic fair payment protocol built on top of standard symmetric and asymmetric encryption primitives, signature, and e-coin schemes. The protocol resists the unconscious double spending attack and other attacks. In general, fairness is provided in that the buyer receives electronic goods (e-goods) if and only if the merchant gets the electronic coins (e-coins), and vice versa. The protocol is optimistic in that a trusted (or semi-trusted, as described below) third party is involved only when there is a dispute. Further, the buyer's privacy is protected.

While many of the examples described herein are provided for purposes of explanation, it is understood that these are only examples. For example, various encryption primitives, signature and e-coin schemes are described, but other such schemes may be used; indeed, each component can be replaced by an equivalent component without affecting the protocol. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing are electronic commerce in general.

In e-business applications, an e-coin can be spent only once by a buyer. Indeed, the unconscious double-spending attack exploits this property to attack other fair payment protocols. E-goods, such as software, on the other hand, may be sold multiple times. Such a multi-use property of e-goods is exploited in the optimistic fair payment protocol described herein, e.g., the trusted third party can provide a key to decrypt the e-goods, the actual e-goods can be verified against a description thereof, and so forth.

Figure 1:
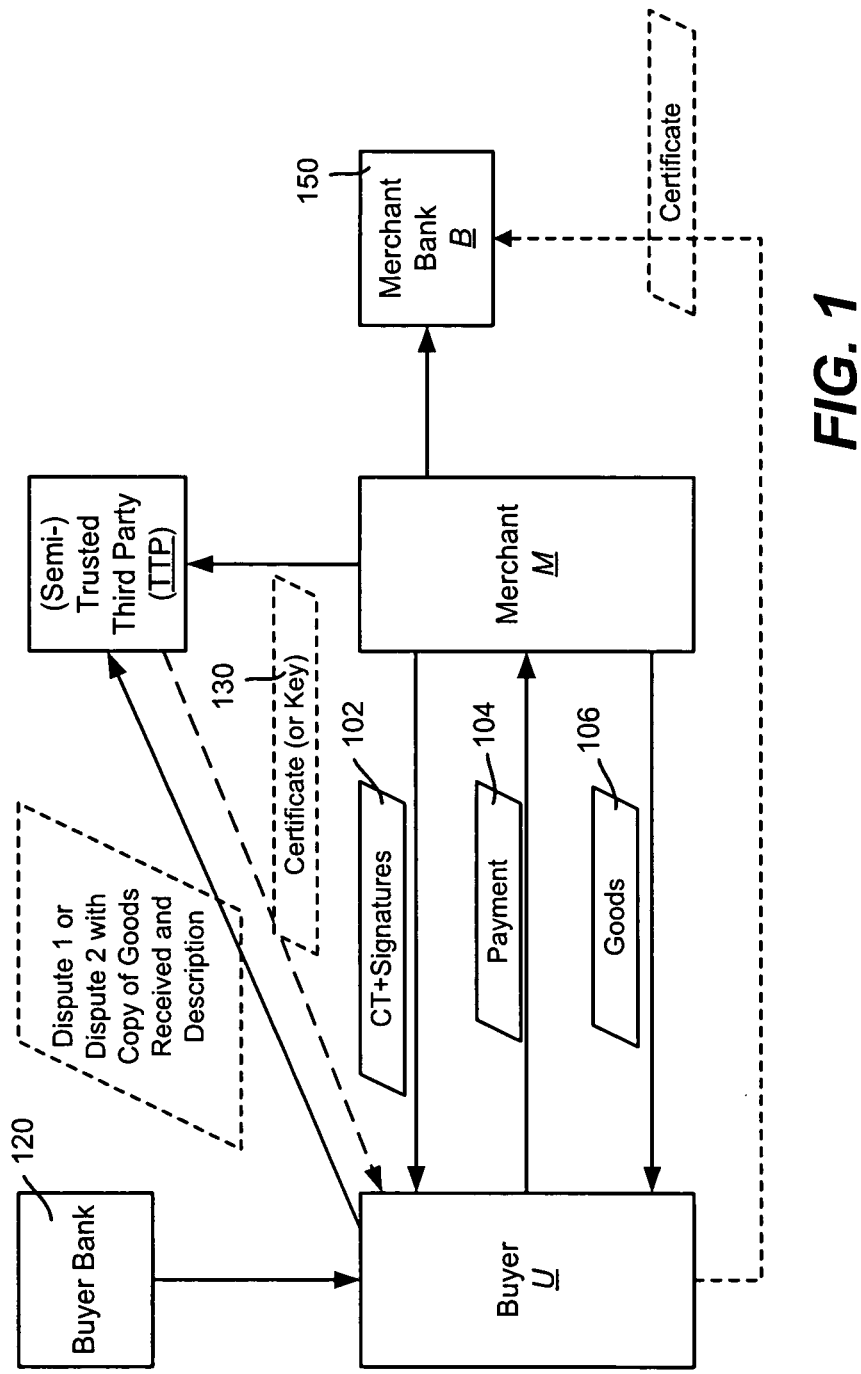
FIG. 1 is a block diagram representing example components in a commercial transaction environment for implementing various aspects of a fair payment protocol as described herein.
Figure 2:
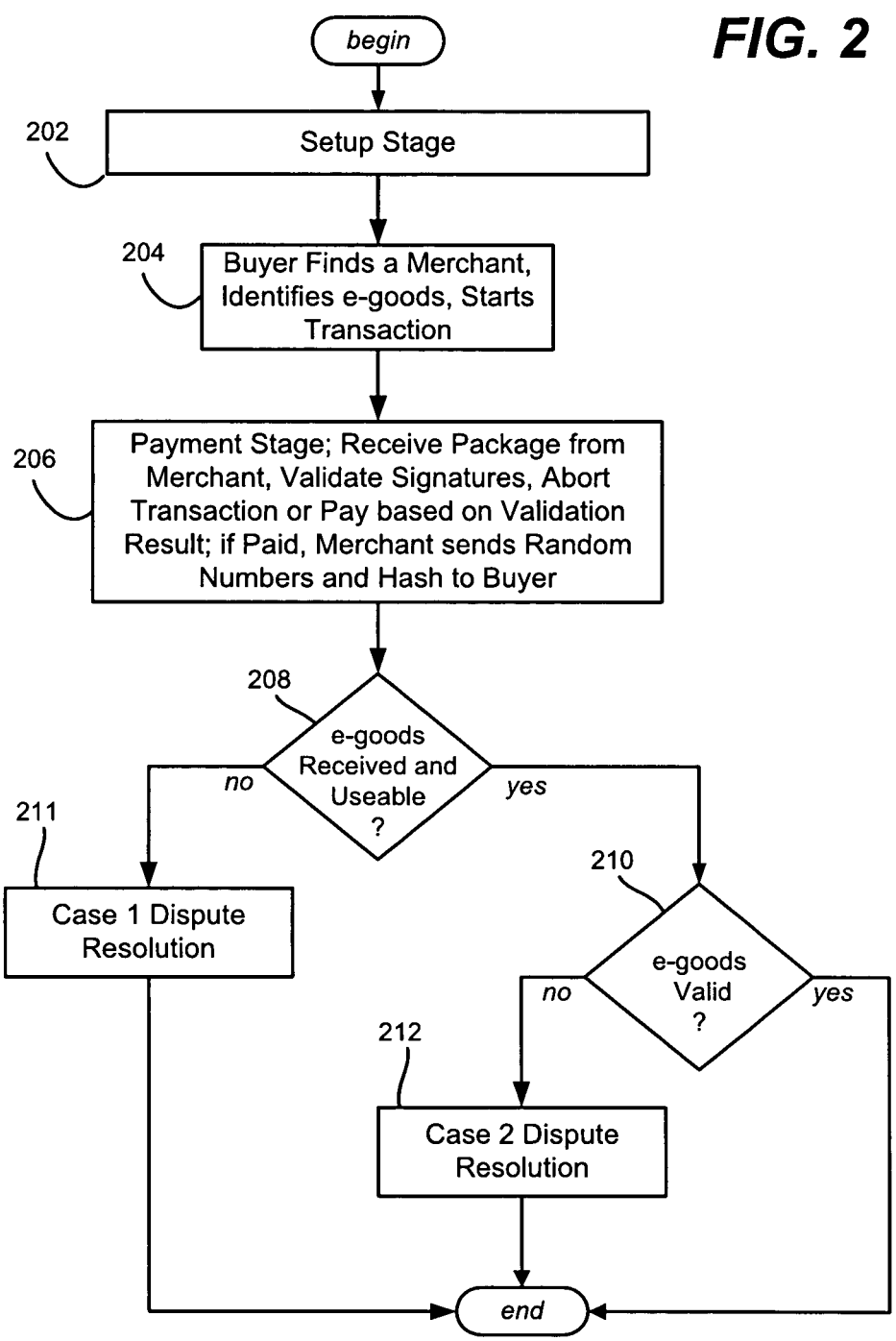
FIG. 2 is a flow diagram showing general operational steps of one example fair payment protocol as described herein.

Turning to FIGS. 1 and 2, as mentioned above, one example protocol is built atop standard symmetric and asymmetric encryption primitives, signature and e-coin schemes. One part of this protocol is the payment stage which is based on a merchant M encrypting the e-goods to be sent, via a symmetric encryption primitive with a session key asymmetrically encrypted with the trusted third party's public key. Then the merchant M generates two signatures on the resulting ciphertexts, and sends the ciphertexts and the signatures (block 102) to a buyer U.

Upon receiving this data (block 102) from the merchant M, the buyer U first checks the validity of the signatures. If the checking passes, the user U sends the pre-agreed amount of e-coins to the merchant M, represented in FIG. 1 by the payment 104. Note that the buyer's interest is protected because if the merchant M refuses to reveal the e-goods or delivers unwanted e-goods, the trusted third party (TTP) can reveal the e-goods or return the e-coins to the buyer, as described below.

In one implementation of the protocol, the merchant M receives the e-cash before delivering the purchased e-goods. Thus, no buyer can obtain e-goods from a merchant without payment. If the merchant practices fraud after having received the e-cash by refusing to deliver the corresponding e-goods or delivering wrong e-goods, the buyer U can resort to the trusted third party TTP to deliver the correct e-goods or obtain a refund (certificate) to get the paid e-cash back through the merchant's bank.

The transaction process is like a face-to-face transaction, e.g., a buyer obtains the encrypted goods (and a receipt from a merchant (as in the above-described payment stage) at the time when the buyer pays money (e-coins) to the merchant (Step 2 of the payment stage). When the buyer attempts to use the goods (as in the next stage) and detects some problems with the goods, the buyer resolves the issue with the merchant or goes to an arbitrator and shows both the goods and the receipt to settle the issue with the merchant (the disputes stage).

Each stage of the framework is described in further detail below. For simplicity in description, the following notation will be used to present one example fair payment protocol:

| | |
|---|---|
| $G_{e\text{-}goods}$ | Purchased e-goods |
| $D_{e\text{-}goods}$ | Description of the e-goods |
| $ID_M$ | Merchant's identity |
| $ID_{trusted\ third\ party}$ | trusted third party's identity |
| $K_M$ | Merchant's private key for a symmetric encryption scheme |
| K | A key in symmetric encryption |
| $\epsilon_k(\cdot), D_k(\cdot)$ | Symmetric encryption and decryption with a secret key k |
| $\mathcal{E}_T^r(\cdot), \mathcal{D}_T(\cdot)$ | Asymmetric encryption with the trusted third party's public key and asymmetric decryption with the trusted third party's private key, where r is a random number used in CCA2 (adaptive Chosen Ciphertext Attack)-secure or rCCA (relaxing Chosen Ciphertext Attack)-secure encryption |
| hash(m) | Cryptographic hash function applied on a message m |
| $Sign_M(m)$ | Merchant's signature on a message m |
| OA | Transaction agreement, including $ID_M$, $ID_{trusted\ third\ party}$, $D_{e\text{-}goods}$, transaction time, the agreed price, etc. |
| \|\| | String concatenation |

Further, the following assumptions for the exemplified fair payment protocol are made:

Assumption 1: The trusted third party is semi-trusted. It observes the rules of the protocol, but can launch active attacks to cheat a buyer to send him valid e-goods.

Assumption 2: The underlying e-coin scheme is secure, i.e., e-coins are unforgeable, untraceable, and can resist double-spending by a malicious user. An example of an e-coin scheme that satisfies these requirements is proposed in Untraceable Off-line Cash in Wallets with Observers", In 13th International Cryptology Conference (CRYPTO 1993), LNCS 773, pp. 302-318, 199.

Assumption 3: The underlying symmetric encryption primitive is CCA (Chosen Ciphertext Attack)-secure.

Assumption 4: The underlying public key encryption primitive is CCA2-secure or rCCA-secure.

Assumption 5: The underlying signature scheme is CMA (Chosen Message Attack)-secure.

Assumption 6: Communications between a buyer and a merchant are through secure channels, and communications between a buyer and the trusted third party are through a reliable and authenticated secure channel. Such a channel can be established by SSL or other protocols.

A setup stage (block 202 of FIG. 2) is directed towards setting up of the underlying symmetric and public key encryption primitives, the signature and the e-coin schemes. In general, a buyer opens an account with a bank 120 (FIG. 1) and withdraws payment as in known e-coin schemes. The merchant sets up goods for securely selling. A buyer then locates goods to purchase and starts a transaction (block 204).

Figure 3:
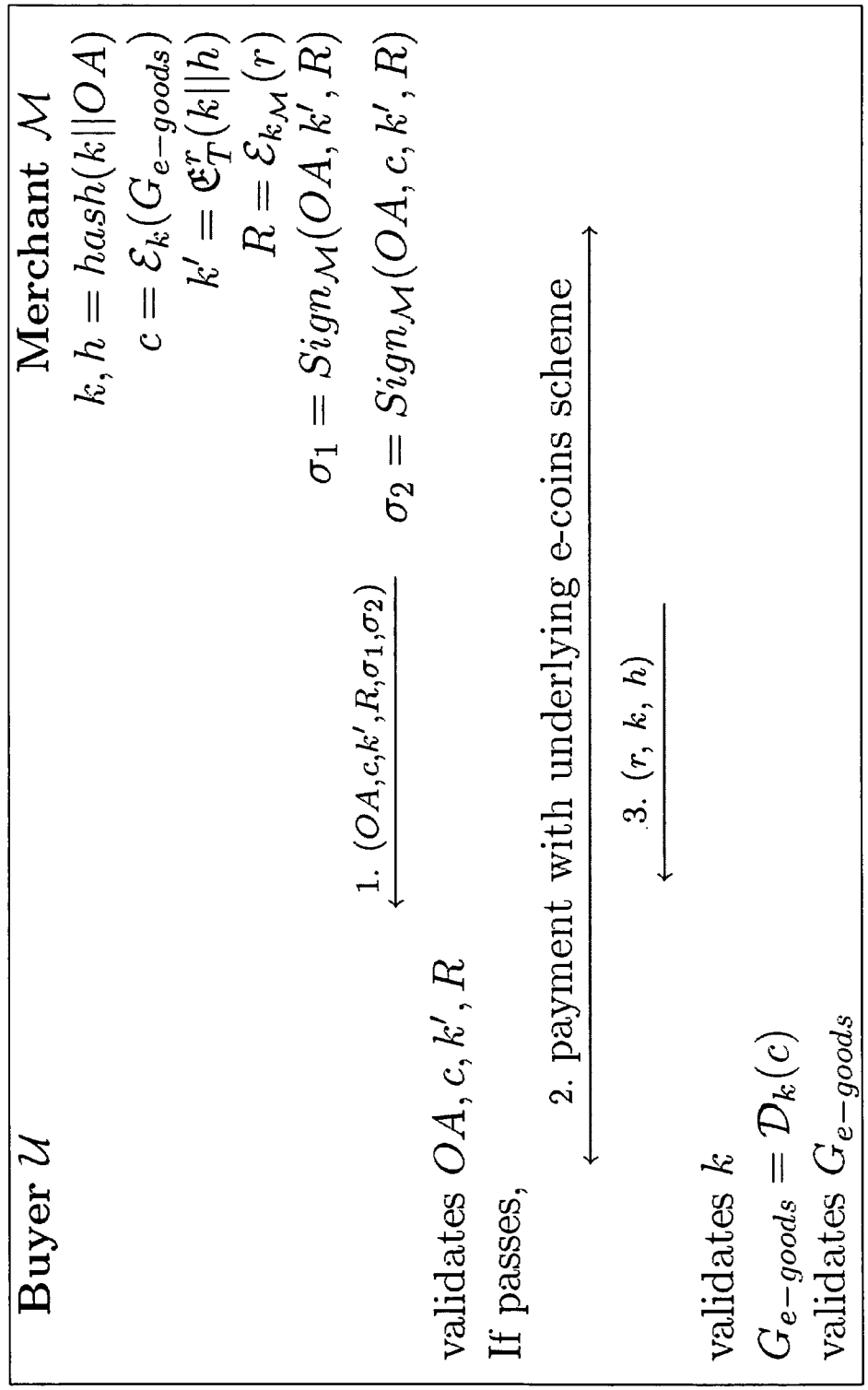
FIG. 3 is a representation of a flow of operations and data between a merchant and a buyer in a payment stage of one example fair payment protocol as described herein.

In a payment stage, generally represented in FIG. 2 by block 206 and by the details in FIG. 3, U and the merchant M exchange e-coins and e-goods. To this end, in one example the merchant M chooses two random numbers k and r, computes h=hash (k||OA), c=$\epsilon_k$ ($G_{e\text{-}goods}$), k'= $\mathcal{E}_T^r$ (k||h), R=$\epsilon_{k_M}$(r), $\sigma_1$=$Sign_M$(OA, k', R), and $\sigma_2$=$Sign_M$ (OA,c,k', R), and sends (OA,c,k', R, $\sigma_1$, $\sigma_2$) to U. The key k is used in the symmetric encryption of the e-goods, k' is an encrypted version of the key k, and R is a ciphertext of r. The functionality of R is described below with reference to the dispute stage.

Upon receiving the data (OA,c,k', R, $\sigma_1$, $\sigma_2$), the buyer U first validates the agreement, goods, key and ciphertext (OA,c,k', and R) with the signatures $\sigma_1$ and $\sigma 2$. If the validation passes, the buyer U executes the payment stage of the underlying e-coin scheme with the merchant M by taking hash (OA||k'||R) as a transaction ID. The e-coins payment scheme assures that the transaction ID cannot be replaced. Otherwise, the buyer U aborts the transaction. On receiving valid e-coins from the buyer U, the merchant M sends the randomly generated numbers and the hash (r,k,h) to the buyer U.

If at step 208 the buyer does not receive the aforementioned data or receives unusable data, the buyer will launch a dispute (step 211), of a type referred to herein as a Case 1 dispute. More particularly, in one example, to determine whether the data is useable, upon receiving (r,k,h), the buyer U checks whether $k' \stackrel{?}{=} \mathfrak{E}_T^r$ (k∥h), and $h \stackrel{?}{=}$ hash (k∥OA). If any equation does not hold, the buyer U at step 211 launches the dispute resolution stage (case 1).

Otherwise, at step 210 the buyer checks the validity of the goods, that is, whether the goods match their description. To this end, the buyer U computes $G_{e\text{-}goods}=D_k(c)$, and checks whether the e-goods $G_{e\text{-}goods}$ are consistent with the previously received description $D_{e\text{-}goods}$ of the e-goods. If they disagree, at step 212 the buyer U launches a second type of dispute, referred to herein as a case 2 dispute resolution stage (case 2).

Figure 4:
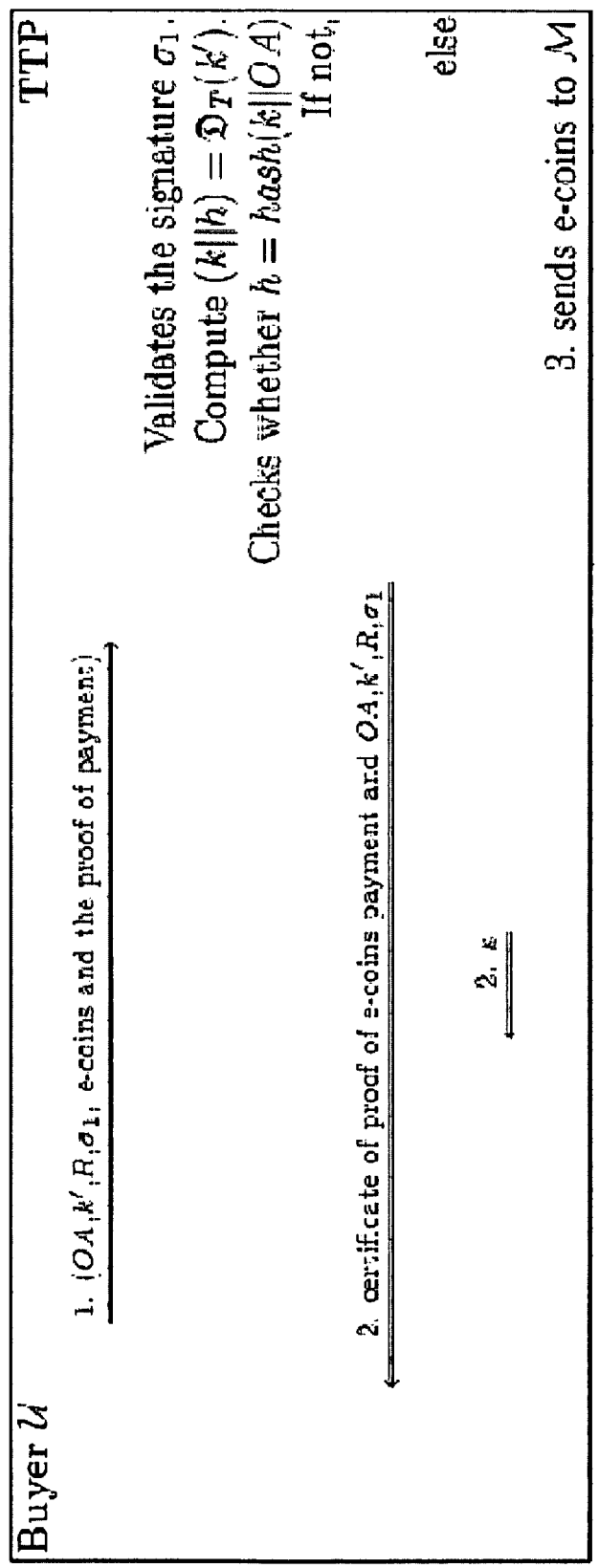
FIG. 4 is a representation of a flow of operations and data between a buyer, a third party dispute resolution service and a merchant in a first type of dispute according to one example fair payment protocol as described herein.

To summarize, if the buyer does not receive (r, k, h), or the received (r, k, h) do not satisfy $k'=\mathfrak{E}_T^r$ (k∥h) or h=hash (k∥OA), the buyer U and the merchant M perform the following steps, as generally represented by block 211 and further detailed in FIG. 4.

In this case 1 type of dispute, the buyer U sends (OA,k', R,(σ₁), the e-coins and the proof of payment for the e-goods to the trusted third party TTP. The trusted third party checks the validity of the signature σ₁; this check ordinarily will pass since the buyer has already validated the merchant's signature 1 in the payment stage, and the communications between the buyer and the trusted third party are assumed to be reliable.

The trusted third party then checks the proof of payment to make sure that the buyer has paid for the e-goods with the e-coins. It terminates if the buyer has not paid. The trusted third party then computes (k∥h)=$\mathfrak{D}_T$ (k'), and checks whether h=hash(k∥OA), in order to prevent colluding attacks by the buyer and a conspiring merchant. If the equation does not hold, the trusted third party TTP sends a certificate 130 of e-coins revocation and a transcript of the transaction to the buyer U, and terminates the dispute stage. The buyer can use the certificate to get back the deposited money and asks for a punishment on the merchant.

As an alternative to the certificate, or before sending the certificate, the trusted third party TTP may send k to the buyer U, and send the e-coins to the merchant M. The e-coins may be ignored if the merchant M has already received the e-coins from the buyer U; they cannot be spent again.

Upon receiving k from the trusted third party at Step 2 of this stage, the buyer U computes $G_{e\text{-}goods}=D_k(c)$, and checks whether the decrypted e-goods $G_{e\text{-}goods}$ agrees with the description $D_{e\text{-}goods}$. Essentially the buyer has returned to step 210 of FIG. 2, this time because the key received from the TTP makes the goods useable. If the e-goods are not valid, that is, the description does not match, the buyer U launches the dispute stage (case 2) at step 212.

Figure 5:
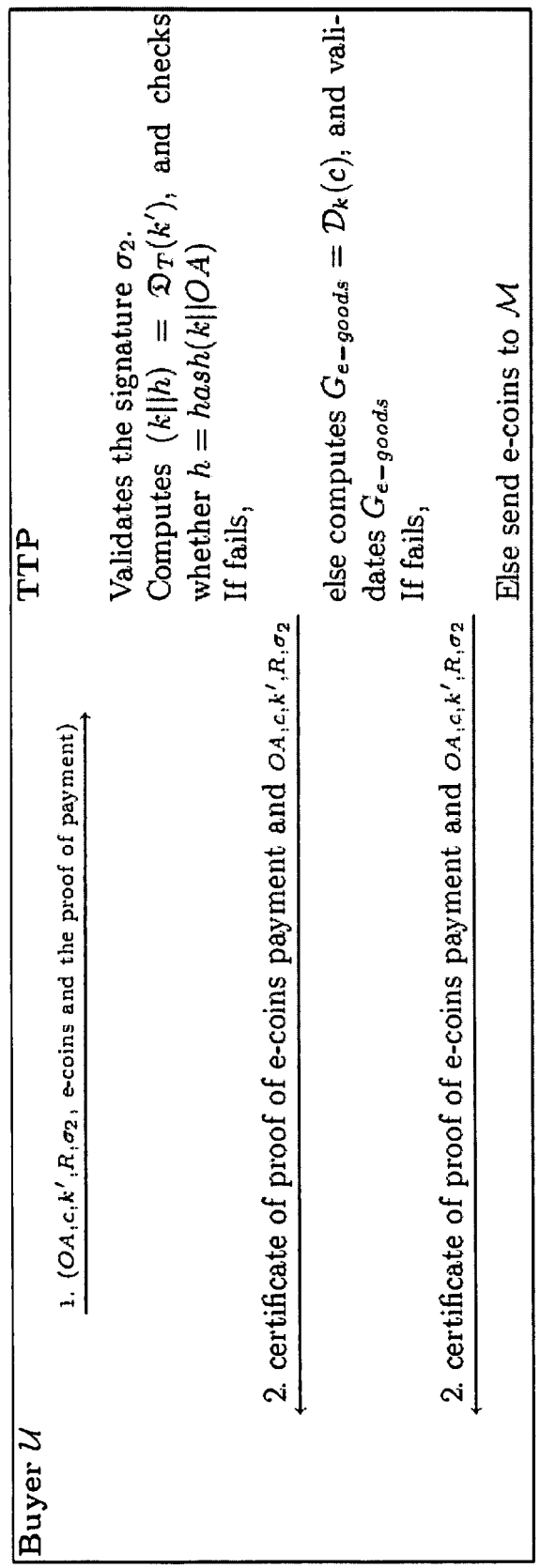
FIG. 5 is a representation of a flow of operations and data between a buyer, a third party dispute resolution service and a merchant in a second type of dispute according to one example fair payment protocol as described herein.

To this end, if the buyer U receives invalid e-goods, the buyer U performs the steps with the trusted third party that are further detailed in FIG. 5. That is, the buyer U sends (OA,c,k',R,σ₂), the e-coins and the proof of payment for the e-goods to the trusted third party TTP. The trusted third party checks validity of the signature 2. Again, this check ordinarily will pass since the buyer has already validated the merchant's signature σ₂ in the payment stage, and the communications between the buyer and the trusted third party are assumed to be reliable.

The trusted third party then checks the proof of payment to make sure that the buyer has paid for the e-goods. It terminates if it determines that the buyer has not paid for the e-goods. It then computes (k∥h)=$\mathfrak{D}_T$ (k') and checks whether h=hash (k∥OA), and computes $G_{e\text{-}goods}=D_k(c)$ and checks whether the decrypted e-goods $G_{e\text{-}goods}$ are consistent with the description $D_{e\text{-}goods}$. If either of the checks fails, the trusted third party sends the buyer U a certificate which shows that an e-coins payment can be cancelled back from the merchant M to the buyer U, and a transcript of the transaction. The buyer U uses this certificate to claim back the e-cash with the merchant's bank 150, and to ask for a punishment on the merchant M.

Alternatively, if both checks pass, the trusted third party concludes that the e-goods matched the description and sends the e-coins to the merchant M.

Note that access to the e-goods a buyer buys are restricted to those who have to access, such as the merchant and the buyer, since e-goods are easily duplicated. A dispute resolution service (e.g., the trusted third party) is involved only if one of the parties in a transaction behaves maliciously (including intentionally or erroneously) or the transaction is interrupted due to communication failure or the like. Indeed, the third party does not access the e-goods in arbitrating a dispute unless and until it has to verify the e-goods with the description as part of the arbitration. Thus, another model in fair payment is directed towards a semi-trusted trusted third party who cannot access the e-goods in arbitrating a dispute unless the dispute is one such that that the e-goods mismatch the e-goods description. Furthermore, in the event that the trusted third party launches an active attack, e.g., the semi-trusted third party unnecessarily requests the buyer to sends the e-goods to it for verifying the validity of the e-goods, such an attack is detectable, whereby the semi-trusted third party is subject to punishment by an external judge.

In the event that the semi-trusted third party attempts to cheat the buyer (to perform case 2) to get the e-goods, since the semi-trusted third party observes the protocols, the buyer would receive a certificate which is used to get back the e-coins. The merchant however needs to prove his innocence with an external judge by providing r from R. By validating the value of r, the external judge can conclude that the semi-trusted third party has behaved maliciously and is to be punished.

There is thus described an electronic commerce protocol which resists various attaches including an unconscious double-spending attack. Further, described is an exchanges and dispute resolution environment in which the dispute resolver is only semi-trusted. At the same time, the privacy of the buyer is protected.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-implemented method performed by a buyer apparatus, the computer-implemented method comprising:

receiving encrypted e-goods, a transaction agreement including a description of the e-goods, and a digital signature from a merchant as part of a transaction;

validating the transaction agreement including the description of the e-goods using the digital signature;

when the transaction agreement is validated, sending payment from the buyer apparatus to the merchant;

determining whether decryption data has been received from the merchant in exchange for the payment;

in a first instance, responsive to determining that the decryption data has not been received from the merchant, launching a dispute with a third party other than the merchant;

in a second instance, responsive to determining that the decryption data has been received from the merchant, determining whether the decryption data received from the merchant is sufficient for the buyer apparatus to decrypt the encrypted e-goods without obtaining further decryption data, and:
  a) responsive to determining that the decryption data received from the merchant is not sufficient for the buyer apparatus to decrypt the e-goods, launching the dispute with the third party, or
  b) responsive to determining that the decryption data is sufficient for the buyer apparatus to decrypt the encrypted e-goods, determining whether the e-goods received from the merchant are valid by decrypting the e-goods with the decryption data and comparing the e-goods to the description of the e-goods in the transaction agreement, and:
    i) when the e-goods are not valid, launching the dispute with the third party; and
    ii) when the e-goods are valid, terminating the transaction without launching the dispute, wherein the payment is sent from the buyer apparatus to the merchant after the buyer apparatus receives the encrypted e-goods and before the buyer apparatus determines whether the decryption data has been received.

2. The method of claim 1, further comprising, in the first instance:
providing payment data corresponding to the payment to the third party, and receiving other decryption data sufficient to decrypt the encrypted e-goods from the third party.

3. The method of claim 2, further comprising:
using the other decryption data received from the third party to determine whether the e-goods received from the merchant are valid by decrypting the e-goods and comparing the e-goods to the description of the e-goods in the transaction agreement,
when the e-goods received from the merchant are determined using the other decryption data to be not valid, launching another dispute with the third party, including providing data corresponding to the e-goods to the third party and providing a description of the e-goods to the third party.

4. The method of claim 3 further comprising:
receiving a refund in response to the another dispute.

5. The method of claim 1, further comprising:
receiving other decryption data from the third party; and
using the other decryption data to determine whether the e-goods received from the merchant are valid by decrypting the e-goods using the other decryption data and comparing the e-goods to the description of the e-goods in the transaction agreement.

6. The method of claim 1, wherein the payment comprises e-coins.

7. The method of claim 3, further comprising:
receiving a refund in response to the another dispute.

8. The method of claim 1, further comprising:
providing the e-goods to the third party; and
providing the description of the e-goods to the third party.

9. The method of claim 8, further comprising:
receiving a refund in response to the dispute.

10. The method according to claim 1, wherein the buyer apparatus and the merchant communicate directly without involving the third party to perform at least:
the receiving the encrypted e-goods, transaction agreement, and digital signature,
the validating the transaction agreement, and
the sending payment,
before the buyer apparatus or the merchant involve the third party.

11. The method according to claim 10, wherein the buyer apparatus only communicates with the third party provided the dispute is launched.

12. The method according to claim 1, wherein the transaction agreement identifies the merchant, the third party, the e-goods, a transaction time, and an agreed price for the e-goods, the method further comprising validating the merchant, the third party, the e-goods, the transaction time, and the agreed price before sending the payment to the merchant.

13. The method according to claim 1, wherein the transaction agreement identifies one or more of the merchant, the third party, the e-goods, a transaction time, or an agreed price for the e-goods, the method further comprising validating at least one of the merchant, the third party, the transaction time, or the agreed price before sending the payment to the merchant.

14. A device comprising:
a processor, and
a memory storing computer readable instructions which, when executed by the processor, cause the processor to perform:
  receiving encrypted e-goods, a transaction agreement including a description of the e-goods, and a digital signature from a merchant as part of a transaction;
  validating the transaction agreement including the description of the e-goods using the digital signature;
  when the transaction agreement is validated, sending payment to the merchant;
  determining whether decryption data has been received from the merchant in exchange for the payment;
  in a first instance when the decryption data has not been received from the merchant, launching a first dispute with a third party other than the merchant;
  in a second instance when the decryption data is received from the merchant but is not sufficient to decrypt the encrypted e-goods without obtaining further decryption data, launching a second dispute with the third party other than the merchant;
  in a third instance when the decryption data is sufficient to decrypt the encrypted e-goods but the e-goods do not match the description of the e-goods in the transaction agreement, launching a third dispute with the third party other than the merchant; and
  in a fourth instance when the decryption data is sufficient to decrypt the encrypted e-goods and the e-goods match the description of the e-goods in the transaction agreement, terminating the transaction without launching any dispute, wherein the payment is sent to the merchant after the encrypted e-goods are received and before determining whether the decryption data has been received.

15. The computing device of claim 14, wherein the computer readable instructions cause the processor to perform:
receiving an encrypted encryption key from the merchant before sending the payment to the merchant; and
validating another signature of the encrypted encryption key before sending the payment to the merchant.

16. The computing device of claim 15, wherein the decryption data comprises a decrypted copy of the encryption key.

17. The computing device of claim 15, wherein launching the second dispute comprises sending the transaction agreement, the encrypted encryption key, and proof of payment to the third party.

18. A hardware computer readable storage media storing computer readable instructions which, when executed by a computer, cause the computer to perform acts comprising:
receiving encrypted e-goods, a transaction agreement including a description of the e-goods, and a digital signature from a merchant as part of a transaction;
validating the transaction agreement including the description of the e-goods using the digital signature;
when the transaction agreement is validated, sending payment to the merchant;
determining whether decryption data has been received from the merchant in exchange for the payment;
in a first instance when the decryption data has not been received from the merchant, launching a first dispute with a third party other than the merchant;
in a second instance when the decryption data has been received from the merchant and the decryption data is not sufficient to successfully decrypt the encrypted e-goods, launching a second dispute with the third party other than the merchant;
in a third instance when the decryption data is received from the merchant, is used to successfully decrypt the encrypted e-goods, and the e-goods do not match the description of the e-goods in the transaction agreement, launching a third dispute with the third party other than the merchant; and
in a fourth instance when the decryption data is received from the merchant, is used to successfully decrypt the encrypted e-goods, and the e-goods match the description of the e-goods in the transaction agreement, terminating the transaction without launching any dispute,
wherein the payment is sent to the merchant after receiving the encrypted e-goods and before determining whether the decryption data has been received.

19. The hardware computer readable storage media of claim 18, the acts further comprising:
in the third instance, receiving a certificate from the third party; and
using the certificate to recover the payment.

20. The hardware computer readable storage media of claim 19, wherein the payment comprises e-coins.

* * * * *